United States Patent
Trabert

(12) 
(10) Patent No.: US 6,322,015 B1
(45) Date of Patent: *Nov. 27, 2001

(54) METHOD OF TAPE ATTACHMENT TO A TAPE CARTRIDGE REEL

(75) Inventor: Steven G. Trabert, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/409,994

(22) Filed: Sep. 30, 1999

Related U.S. Application Data

(63) Continuation of application No. 09/162,957, filed on Sep. 29, 1998, now Pat. No. 5,992,783.

(51) Int. Cl.$^7$ ................................................. G11B 23/087
(52) U.S. Cl. .......................... 242/341; 360/132; 360/134
(58) Field of Search ................................. 242/324, 341, 242/348; 360/132, 134

(56) References Cited

U.S. PATENT DOCUMENTS

| | | |
|---|---|---|
| 3,741,497 | 6/1973 | Ganske . |
| 3,932,894 | 1/1976 | Arter et al. ................ 360/134 |
| 4,110,142 | 8/1978 | Tall . |
| 4,333,619 | 6/1982 | Schoettle et al. . |
| 4,899,946 | 2/1990 | Espin et al. . |
| 5,394,277 | 2/1995 | Pahr et al. . |
| 5,394,280 | 2/1995 | Chliwnyj et al. . |
| 5,431,356 | 7/1995 | Horstman et al. . |
| 5,432,652 | 7/1995 | Comeaux et al. . |
| 5,629,813 | 5/1997 | Baca et al. . |

FOREIGN PATENT DOCUMENTS

| | | |
|---|---|---|
| 0 592 042 | 10/1993 | (EP) . |
| 0 630 000 A2 | 12/1994 | (EP) . |

*Primary Examiner*—John Q. Nguyen
(74) *Attorney, Agent, or Firm*—Wayne P. Bailey

(57) ABSTRACT

A method of attaching a tape having longitudinal edges to a tape cartridge reel includes cutting an end of the tape non-perpendicularly to the longitudinal edges laterally across the width of the tape. The end of the tape is then attached to the tape cartridge reel. The method may also include cutting an end of the tape such that at least two of the laterally spaced apart servo stripes running longitudinally along the tape are cut at different longitudinal positions along the tape. The method may further include cutting the tape end such that at least two of the laterally spaced apart data tracks running longitudinally along the tape are cut at different longitudinal positions along the tape.

8 Claims, 3 Drawing Sheets

METHOD OF TAPE ATTACHMENT TO A TAPE CARTRIDGE REEL

This application is a continuation of Ser. No.09/162,957, filed Sep. 29, 1998, U.S. Ser. No. 5,992,783.

TECHNICAL FIELD

The present invention relates generally to tape cartridges and, more particularly, to an improved method of attaching magnetic tape to the reels of a magnetic tape cartridge.

BACKGROUND ART

Typically, to attach magnetic tape to the reels of a magnetic tape cartridge or cassette, the tape is cut perpendicularly to its longitudinal edges laterally across its width at each end. The ends are then attached to the reels of the cartridge and the tape is wrapped around the reels. Ideally, the tape wraps are perfectly smooth. In reality, a discontinuity exists on each reel along the lateral interface where the end of the tape attaches to the reel. The discontinuity causes an impression or imprint in the first few hundred tape wraps.

Data written on the longitudinally extending, parallel data tracks of the tape may not be consistently retrievable because the impression affects all of the data tracks at the same lateral location at the same time. This results in data errors. The severity of the errors may be such that the error correction code written on the data tracks to protect the data tracks cannot recover the data.

Similarly, servo information written on the longitudinally extending, parallel servo tracks of the tape may also not be consistently retrievable because the impression affects all of the servo tracks at the same lateral location at the same time. Thus, the servo redundancy cannot be used to recover the servo information. This results in servo errors and subsequent incorrect lateral positioning of the tape head with respect to the tape.

Tape impressions are a continuing problem in the data storage industry. Not using the portion of the tape with impressions results in wasted data storage capability and wasted time, as the tape must always be advanced past the unusable portions.

What is needed is a method of attaching tape to the reels of a cartridge such that impressions do not affect all of the data tracks and servo stripes at the same lateral location at the same time. The needed method must take advantage of the error correction code and servo redundancy such that data and servo information from the tape wraps may be consistently retrievable regardless of impressions.

SUMMARY OF THE INVENTION

Accordingly, it is an object of the present invention to provide a method of attaching tape to the reels of a cartridge such that data and servo errors caused by impressions are spread out longitudinally along the tape.

It is another object of the present invention to provide a method of attaching tape to the reels of a cartridge such that impressions only corrupt some of the data tracks at any one time while a tape head is reading the tape.

It is a further object of the present invention to provide a method of attaching tape to the reels of a cartridge such that impressions only corrupt some of the servo tracks at any one time while a tape head is reading the tape. It is still another object of the present invention to provide a method of attaching tape to the reels of a cartridge which includes cutting the tape ends to be attached to the reels non-perpendicularly to the longitudinal edges of the tape laterally across the width of the tape.

It is still a further object of the present invention to provide a method of attaching tape to the reels of a cartridge which includes cutting the tape ends to be attached to the reels as a function of the correctional capability of the error correction code and the redundant servo information.

In carrying out the above objects and other objects, the present invention provides a method of attaching a tape having longitudinal edges to a tape cartridge reel. The method includes cutting an end of the tape non-perpendicularly to the longitudinal edges laterally across the width of the tape. The end of the tape is then attached to the tape cartridge reel.

Further, in carrying out the above objects and other objects, the present invention provides another method of attaching a tape to a tape cartridge reel. The tape includes longitudinal edges and laterally spaced apart servo stripes running longitudinally along the tape. This method includes cutting an end of the tape such that at least two of the servo stripes are cut at different longitudinal positions along the tape. The end of the tape is then attached to the tape cartridge reel.

The tape may include laterally spaced apart data tracks running longitudinally along the tape. Cutting an end of the tape may then also include cutting the end such that at least two data tracks are cut at different longitudinal positions along the tape. Thus, the end of the tape is cut non-perpendicularly to its longitudinal edges laterally across its width to cut the at least two servo stripes and the at least two data tracks at different longitudinal positions along the tape.

In accordance with the methods of the present invention, a tape cartridge is also provided.

These and other features, aspects, and embodiments of the present invention will become better understood with regard to the following description, appended claims, and accompanying drawings.

BEST MODES FOR CARRYING OUT THE INVENTION

Figure 1:
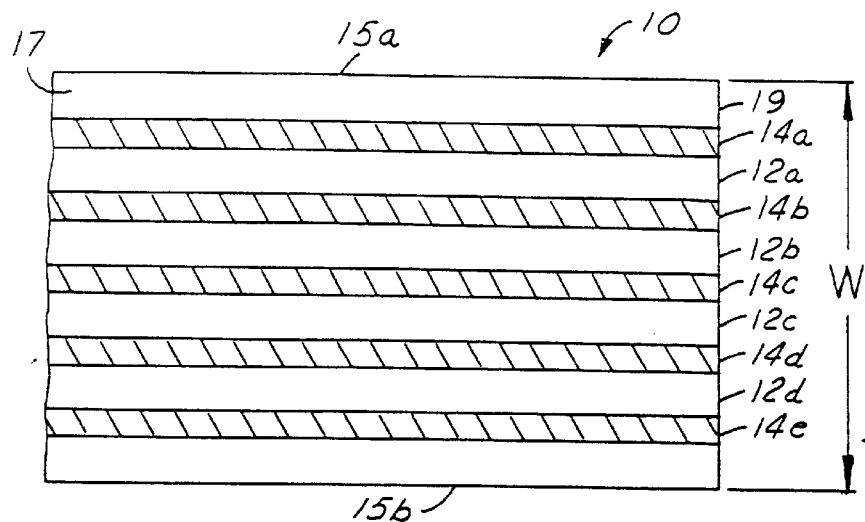
FIG. 1 illustrates multiple data bands and servo stripes on magnetic tape.

Referring now to FIG. 1, magnetic tape 10 having parallel, laterally spaced apart data bands 12(a–d) running longitudinally along the tape is shown. Tape 10 also includes parallel, laterally spaced apart servo stripes 14(a–e) interposed between data bands 12(a–d) and running longitudinally along the tape. Tape 10 includes longitudinal edges 15(a–b) separated by a width (W) of the tape. Data bands 12(a–d) and servo stripes 14(a–e) preferably run from end 17 to end 19 of tape 10. However, tape 10 may have an area at each end that does not have any data bands and servo stripes.

Figure 2:
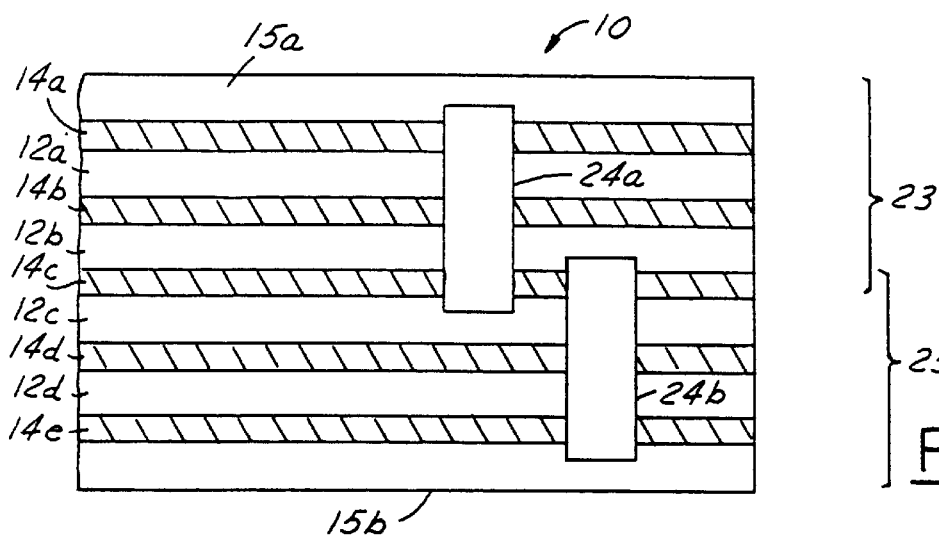
FIG. 2 illustrates the magnetic tape shown in FIG. 1 with a movable tape head shown in upper and lower positions.

As shown in FIG. 2, tape 10 includes four data bands 12(a–d). Each of data bands 12(a–d) includes nine sets of eight data tracks for a total of seventy-two data tracks (not specifically shown). A movable tape head is shown in an upper position 24a in an upper band 23 of tape 10 adjacent to the tape. Similarly, the tape head is shown in a lower position 24b in a lower band 25 of tape 10 adjacent to the tape. The tape head is movable between the upper and lower positions 24(a–b) and is in only one of the positions at a given time.

The tape head includes two sets of eight read/write elements (shown in FIG. 7) to read from and write to one set of data tracks in each of data bands 12a and 12b simultaneously in upper position 24a. Thus, one set of eight data tracks in each of data bands 12a and 12b are active at one time when the tape head is in upper position 24a. Similarly, the tape head can read from and write to one set of data tracks in each of data bands 12c and 12d simultaneously in lower position 24b. Thus, one set of eight data tracks in each of data bands 12c and 12d are active at one time when the tape head is in lower position 24b. Thus, a total of sixteen data tracks are active at any one time when the tape head is in either upper or lower positions 24(a–b).

The tape head is laterally movable across tape 10 between different sets of data tracks in data bands 12(a–d). A tape head controller (not specifically shown) controls the tape head to laterally move it across upper and lower bands 23 and 25 of tape 10.

Figure 3:
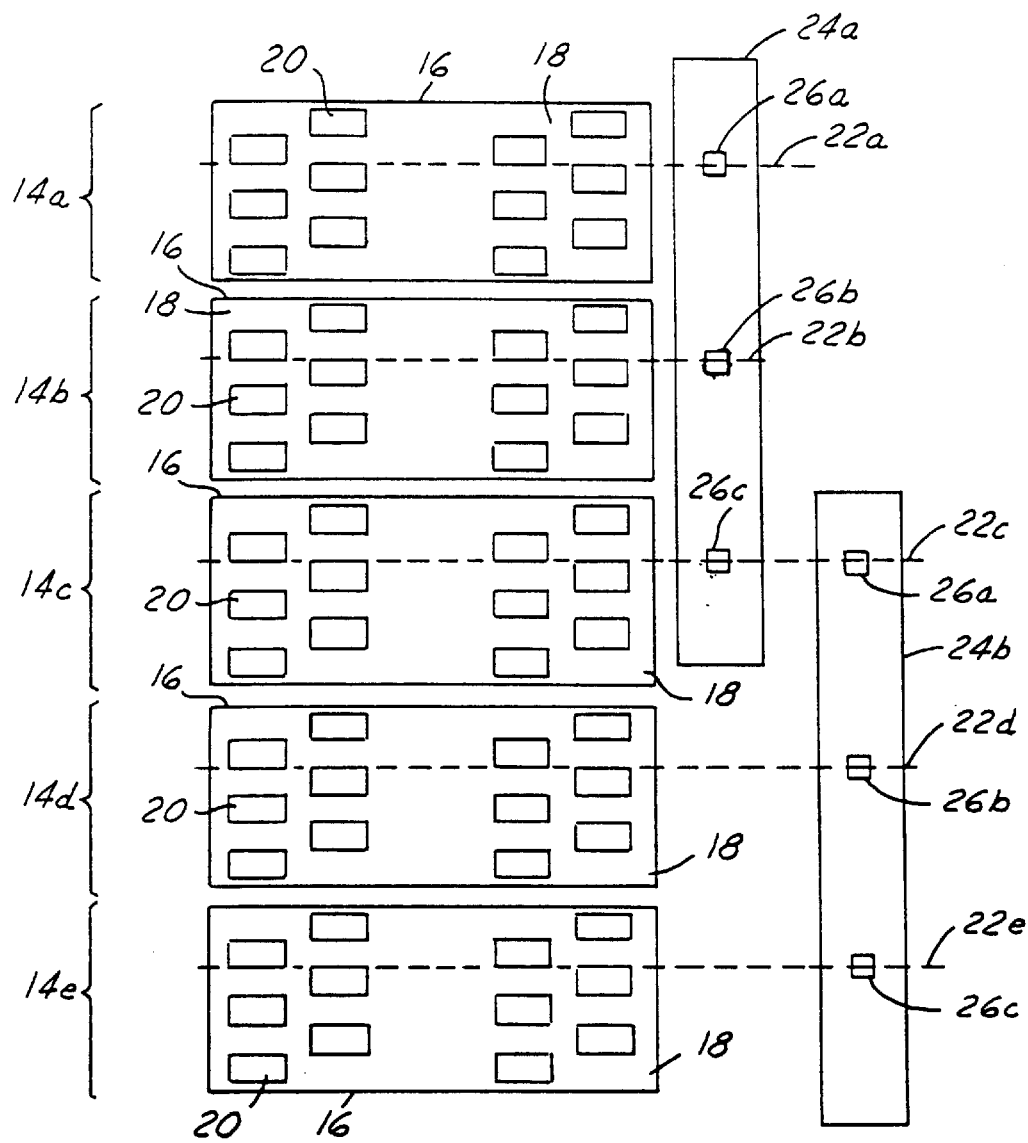
FIG. 3 illustrates the servo pattern written onto the servo stripes for use with the tape head.

Referring now to FIG. 3, each servo stripe 14(a–e) includes a frame 16. A first frequency signal 18 is written onto frame 16. An erase frequency signal 20 is written over first frequency signal 18 in a predetermined pattern to define longitudinally extending servo tracks 22(a–e). The predetermined pattern is preferably a checkerboard pattern of erase frequency signal rectangles 20 written over first frequency signal 18 parallel to longitudinal edges 15a and 15b of tape 10 as shown in FIG. 3. Servo tracks 22(a–e) are defined by the horizontal interfaces between erase frequency signal rectangles 20. Of course, any pattern of erase frequency signals may be used to define servo tracks.

The tape head includes servo read elements 26(a–c) to read respective servo tracks 22(a–c) when the tape head is in upper position 24a. Similarly, servo read elements 26(a–c) read respective servo tracks 22(c–e) when the tape head is in lower position 24b. As tape 10 moves across the tape head, each servo read element 26(a–c) reads a corresponding servo track 22(a–e) and generates a position error signal. The position error signals are indicative of the lateral positions of servo read elements 26(a–c) with respect to the servo tracks. The position error signals are also indicative of the lateral position of the tape head with respect to the data tracks. Servo read elements 26(a–c) provide the position error signals to a servo loop for use by the tape head controller (not specifically shown). Tape head controller moves the tape head to move servo read elements 26(a–c) as a function of the position error signals to enable precise servo track following.

Tape 10 has multiple servo stripes 14(a–e) laterally spaced across the width (W) of the tape to improve the accuracy with which the servo loop operates. The position error signals generated by servo read elements 26(a–c) may be concurrently read and averaged. The position of the tape head is maintained by the servo loop in response to the average, rather than the position error signal from any one servo read element. Such redundancy makes the servo loop less susceptible to error or failure due to an error by any one servo read element. Ideally, the servo loop will recognize corrupted position error signals and only use the redundant position error signals.

Figure 4:
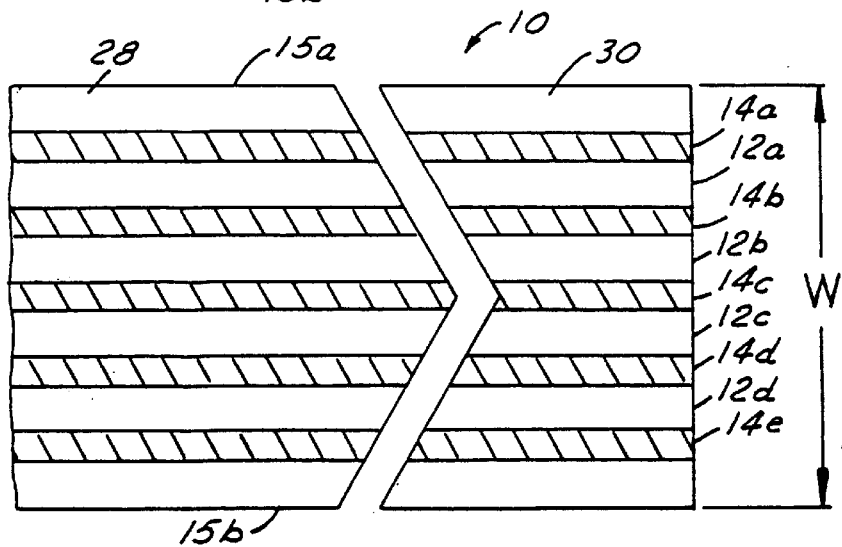
FIG. 4 illustrates the ends of the tape cut in accordance with the present invention.

Referring now to FIG. 4, tape 10 is cut in accordance with the present invention into two ends 28 and 30. Each of ends 28 and 30 is cut nonperpendicularly to longitudinal edges 15(a–b) laterally across the width (W) of tape 10. Thus, at least two of servo stripes 14(a–c) in upper band 23 and at least two servo stripes 14(c–e) in lower band 25 are cut at different longitudinal positions along tape 10. Similarly, at least two data tracks in each of upper and lower bands 23 and 25 are cut at different longitudinal positions along tape 10.

Figures 5A, 5B:
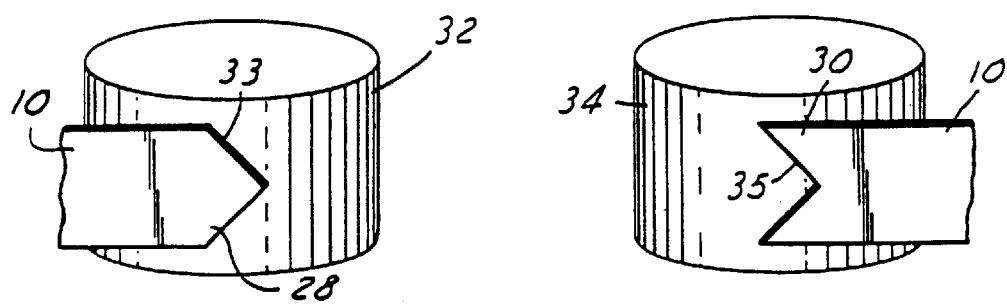
FIGS. 5A and 5B illustrate the ends of the tape shown in FIG. 4 attached to the hubs of the reels of a tape cartridge.

Referring now to FIG. 5A, end 28 of tape 10 is attached to a hub 32 of a reel of a tape cartridge. End 28 is attached to hub 32 by initially placing a liquid on the hub and then wrapping tape 10 around the hub as known to those of ordinary skill in the art. As tape 10 is wrapped around hub 32 an impression 33 forms where end 28 is attached to the hub. Impression 33 mirrors the outline of end 28.

Similarly, as shown in FIG. 5B, end 30 of tape 10 is attached to a second hub 34 of a second reel of a tape cartridge. As tape 10 is wrapped around hub 34 an impression 35 forms where end 30 is attached to hub 34. Impression 35 mirrors the outline of end 30.

Figure 6A:
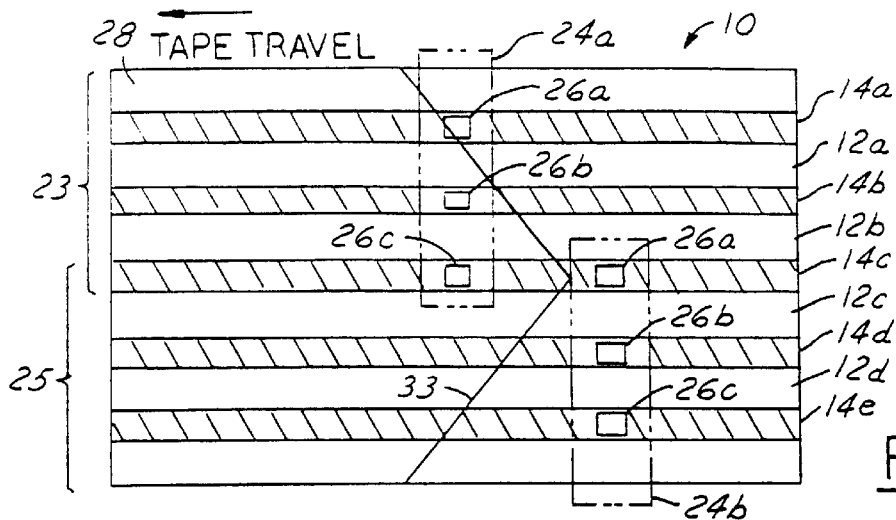
FIGS. 6A and 6B illustrate the tape head reading the tape shown in FIG. 4 as the tape moves across the tape head.

Referring now to FIG. 6A, the tape head is positioned to read a portion of tape 10 having impression 33 at a given instant of time as the tape is moving across the tape head. Impression 33 affects servo stripes 14(a–e) at different longitudinal positions of tape 10. As a result, some of servo stripes 14(a–e) are affected by impression 33 when the tape head is positioned in either upper or lower positions 24(a–b) to read these servo stripes as tape 10 moves at the given instant of time.

For instance, as shown in FIG. 6A, when the tape head is in upper position 24a, servo read elements 26b and 26c can read their respective servo stripes 14b and 14c without being affected by impression 33. Servo read elements 26b and 26c do not read any tape distortion because the portions of the servo stripes being read are relatively smooth. Similarly, when the tape head is in lower position 24b, servo read elements 26(a–c) can read their respective servo stripes 14(c–e) without being affected by impression 33.

However, the portion of servo stripe 14a read by servo read element 26a when the tape head is in upper position 24a is affected by impression 33 at the given instant of time. This is shown in FIG. 6A by impression 33 running through servo read element 26a. Consequently, servo information read by servo read element 26a may be in error.

An advantage of the present invention is that because the servo information is redundant the tape head controller can use the other unaffected servo information, i.e., servo information from servo read elements 26(b–c), to maintain the proper lateral position of the tape head with respect to tape 10. Thus, as long as one of servo stripes 14(a–c) in upper band 23 of tape 10 is unaffected by impression 33 at a given instant of time, the proper positioning of the tape head in the upper band can be maintained. Likewise, as long as one of servo stripes 14(c–e) in lower band 25 of tape 10 is unaffected by impression 33 in a given instant of time, the proper positioning of the tape head in the lower band can be maintained. As a result, end 28 of tape 10 is cut such that only part of the servo information in each band of tape may be corrupted by an impression at any one time.

Figure 6B:
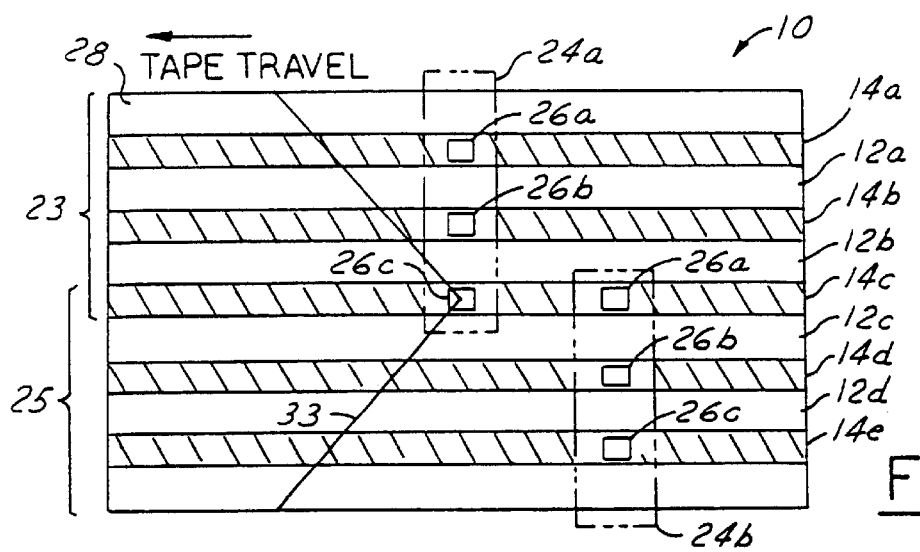

Referring now to FIG. 6B, tape 10 has moved in the next instant of time along the direction of the tape travel from its position shown in FIG. 6A.

Now, when the tape head is in upper position 24a, servo read elements 26a and 26b can read their respective servo stripes 14a and 14b without being affected by impression 33. Similarly, when the tape head is in lower position 24b, servo read elements 26(a–c) can read their respective servo stripes 14(c–e) without being affected by impression 33.

However, the portion of servo stripe 14c read by servo read element 26c when the tape head is in upper position 24a is affected by impression 33 at the given instant of time. This is shown in FIG. 6B by impression 33 running through servo read element 26c. Consequently, servo information read by servo read element 26c may be in error. As before, the tape head controller can use the other unaffected redundant servo information to maintain the proper lateral positioning of the tape head with respect to upper band 23 of tape 10.

Each of ends 28 and 30 of tape 10 is cut non-perpendicularly to longitudinal edges 15(a–b) laterally across the width (W) of the tape such that all of servo stripes 14(a–e) in each of upper and lower bands 23 and 25, servo stripes 14(a–c) in the upper band and servo stripes 14(c–e) in the lower band, are not affected by an impression at the same longitudinal position along the tape at the same time. As used herein, the term non-perpendicular cut means a cut in the shape of a chevron, a "V" on either of its side, a straight diagonal, and the like. Attaching non-perpendicularly cut ends to the hubs of a cartridge ensures that the impressions formed as the tape is wrapped around the hubs only corrupts a part of the servo information at any one time.

Figure 7:
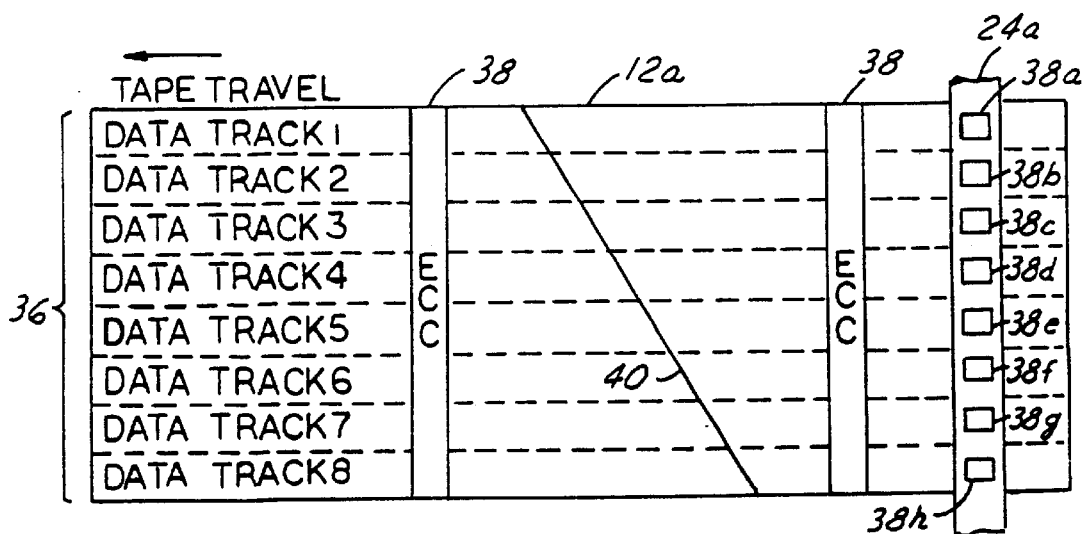
FIG. 7 illustrates a data band having a set of data tracks with a simplified version of error correction coding.

Referring now to FIG. 7, a set of data tracks 36 longitudinally extending along data band 12a is shown. As stated above, each of the data bands 12(a–d) include nine sets of data tracks with each set having eight data tracks. Typically, each set includes the same number of data tracks as the number of read/write elements used for that data band in a tape head. In operation, read/write elements 38(a–h) of the tape head are in parallel with data tracks 36 and the tape head may concurrently read from and write to the data tracks. The tape head provides the serially read data from data tracks 36 to a processor (not specifically shown) which processes the data and puts it in a proper format.

The set of data tracks 36 includes error correction code (ECC) areas 38. ECC areas 38 contain error correction coding used for correcting corrupted data read from data tracks 36. ECC areas 38 can correct corrupted data as long as the severity of the data errors are within limits. For simplicity, ECC area 38 is shown in FIG. 7 as extending laterally across all of data tracks 36 at given longitudinal positions of tape 10. For this simplified case, the severity of the data errors is outside of the acceptable limit when the data in data tracks 36 is corrupted at the same longitudinal position along tape 10.

As shown in FIG. 7, tape 10 is cut such that impression 40 affects at least two data tracks 36 in the set at different longitudinal positions along the tape. Thus, impression 40 formed from the cut end of the tape does not corrupt all of the data tracks 36 at any one time when the tape head is positioned to read the data tracks as tape 10 moves.

Cutting the tape to longitudinally spread out any servo errors caused by an impression also longitudinally spreads out any data errors caused by the impression. Because the data errors are spread out longitudinally, the error correction code written onto the data tracks may recover the data when an error occurs.

Typically, the ECC is intimately mixed with the data of data tracks 36 such that it is longitudinally and laterally spread about the data tracks. The ECC may also be distributed across all of the data bands that are concurrently used. This alone may be sufficient to prevent the data error caused by perpendicularly cut ends from being outside of the acceptable limit. In any event, the distribution of the ECC should be designed with knowledge of the likely tape defects. Tape defects typically include longitudinal scratches in the tape as well as the impression caused by the imprint of the ends.

Thus it is apparent that there has been provided, in accordance with the present invention, a method of attaching a tape to a tape cartridge reel that fully satisfies the objects, aims, and advantages set forth above. While the present invention has been described in conjunction with specific embodiments thereof, it is evident that many alternatives, modifications, and variations will be apparent to those skilled in the art in light of the foregoing description.

What is claimed is:

1. A method of attaching a tape having longitudinal edges to a tape cartridge reel, wherein the tape includes laterally spaced apart servo marks running longitudinally across at least a portion of the tape, the method comprising:

cutting an end of the tape non-perpendicularly to the longitudinal edges of the tape;

attaching the tape to the tape cartridge reel; and forming an impression on the tape by wrapping the tape at least once around the tape cartridge reel and over the tape cut such that at least one of the servo marks is aligned with the impression and another of the servo marks is misaligned with the impression.

2. A method of attaching a tape having longitudinal edges to a tape cartridge reel, wherein the tape includes laterally spaced apart data tracks running longitudinally across at least a portion of the tape, the method comprising:

cutting an end of the tape non-perpendicularly to the longitudinal edges of the tape;

attaching the tape to the tape cartridge reel; and forming an impression on the tape by wrapping the tape at least once around the tape cartridge reel such that an impression error in one data track is laterally misaligned with an impression error in another data track.

3. A tape cartridge, comprising:

a reel; and tape having a shaped end and wrapped around the reel such that a portion of the tape overlaps the shaped end such that at least two laterally spaced apart servo stripes on the tape and overlying the tape cut have impression errors at different longitudinal positions along the tape.

4. A tape cartridge, comprising:

a reel; and tape wrapped at least once around the reel, wherein an end of the tape is cut such that at least two laterally spaced apart data tracks on the tape and overlying the tape cut have impression errors at different longitudinal positions along the tape.

5. A tape cartridge, comprising:

a reel; and tape wrapped at least once around the reel and having an impression where the tape overlaps an underlying end of the tape, wherein the end of the tape is cut such that at least two laterally spaced apart information marks on the tape have impression errors at different longitudinal positions along the tape.

6. A method of using the tape cartridge of claim 5, comprising the steps of:

passing the tape by a head having a plurality of read elements;

using one of the at least two information marks to maintain head alignment during a first time; and using another of the at least two information marks to maintain head alignment during a second time.

7. The tape cartridge of claim 5 further comprising:

a second reel; and tape wrapped at least once around the second reel and having a second impression where the tape overlaps an underlying second end of the tape, wherein the second end of the tape is cut such that at least two information marks on the tape have impression errors at different longitudinal positions along the tape.

8. The tape cartridge of claim 7 wherein the tape has longitudinal edges and wherein both ends of the tape are cut non-perpendicularly to the longitudinal edges laterally across the width of the tape.

* * * * *